Figure 1:
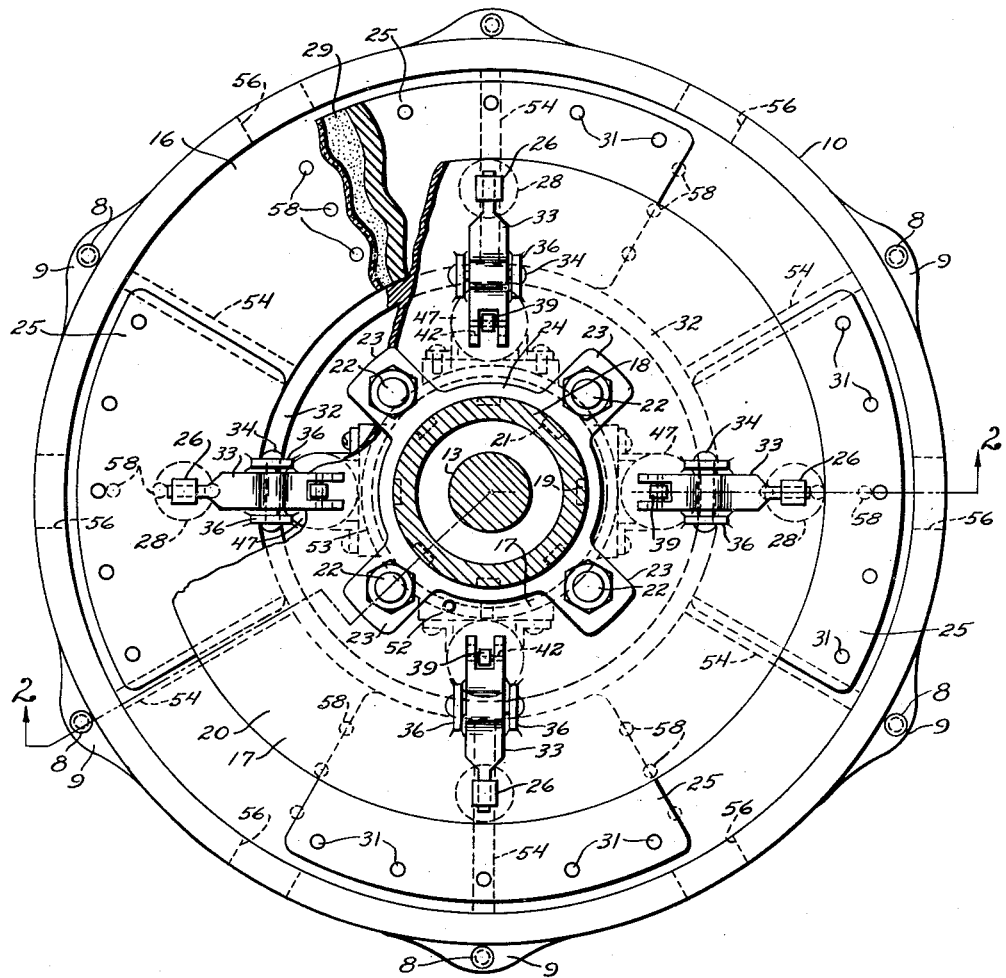

INVENTOR.
GEORGE WALTHER, SR.
BY
ATTORNEYS

Feb. 8, 1955  G. WALTHER, SR  2,701,626
BRAKE DRUM
Filed July 14, 1951  4 Sheets-Sheet 4
FIG. 4
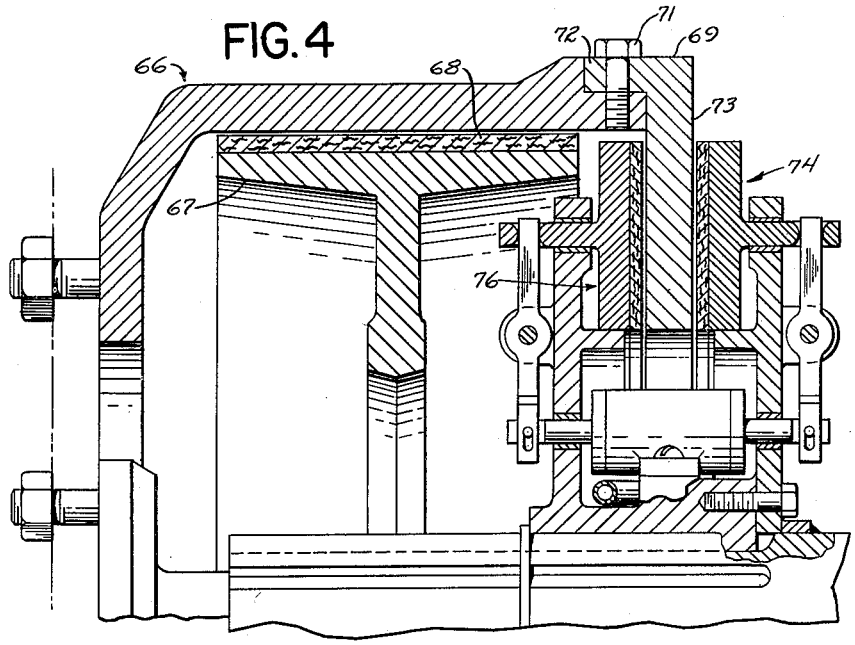
FIG. 6
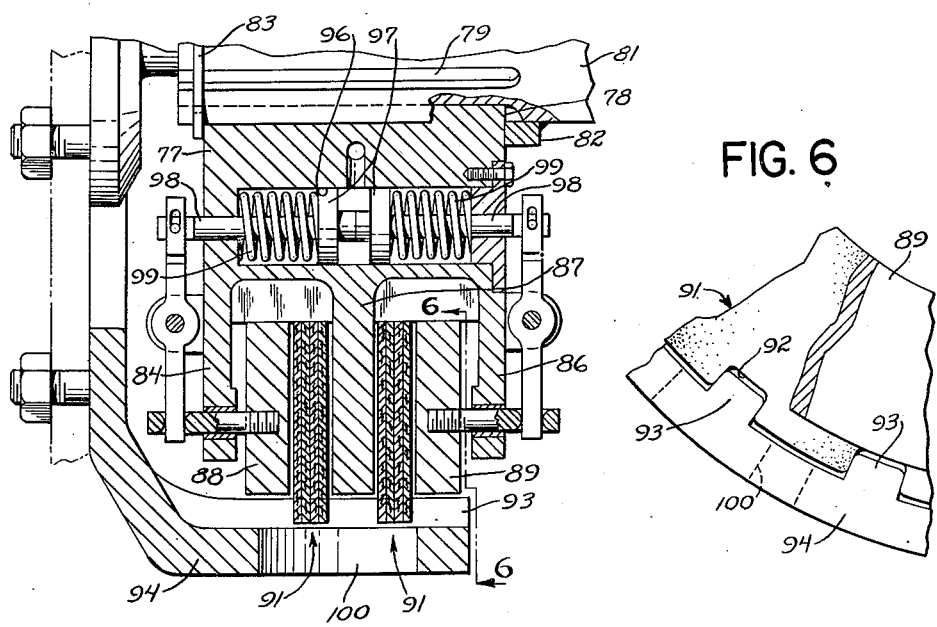
FIG. 5
*INVENTOR.*
GEORGE WALTHER, SR.
BY
ATTORNEYS

United States Patent Office 2,701,626
Patented Feb. 8, 1955

2,701,626

BRAKE DRUM

George Walther, Sr., Montgomery County, Ohio, assignor to The Dayton Steel Foundry Company, Dayton, Ohio, a corporation of Ohio Application July 14, 1951, Serial No. 236,740

7 Claims. (Cl. 188—72)

This invention relates to a brake drum assembly and, in particular, to a brake drum having inwardly extending radial flanges engageable by brake shoes which are movable parallel to the drum axis.

It is a principal object of the invention to increase the efficiency of brake drums by increasing the possible area of contact of the braking surfaces without increasing the normal bulk of the drum. This is possible by employing radial flanges inside the drum, but such construction is objectionable in one sense, in that it increases the amount of material through which the heat must pass in being dissipated and causes piling up of heat in the air within the drum. It is, therefore, a further object of the invention to provide an improved cooling system uniquely related to a drum having radial braking flanges. More particularly, it is an object to provide air-moving vanes in cooperation with radial braking flanges with ports located in correspondingly cooperative relation with such flanges.

Figure 2:
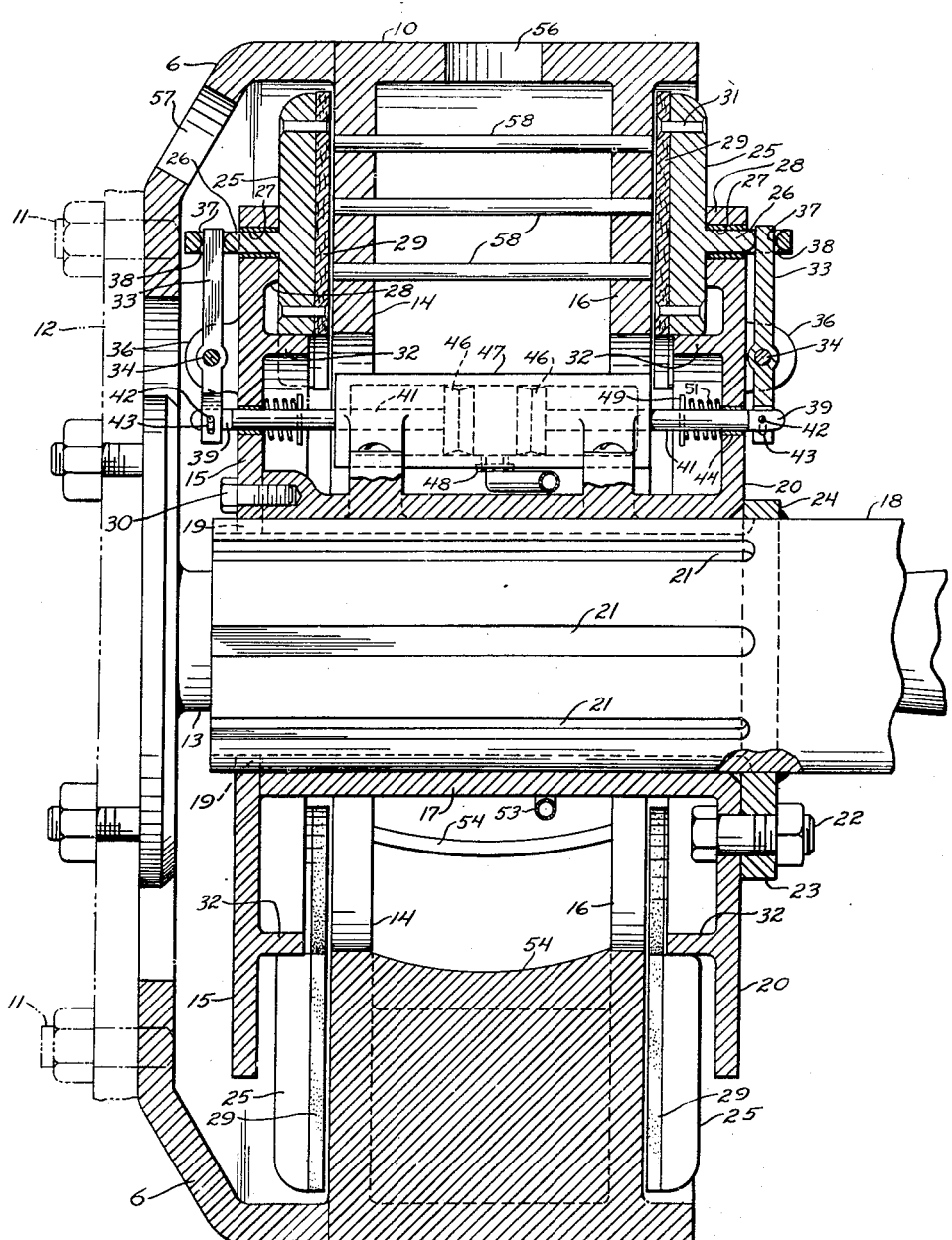
Figure 3:
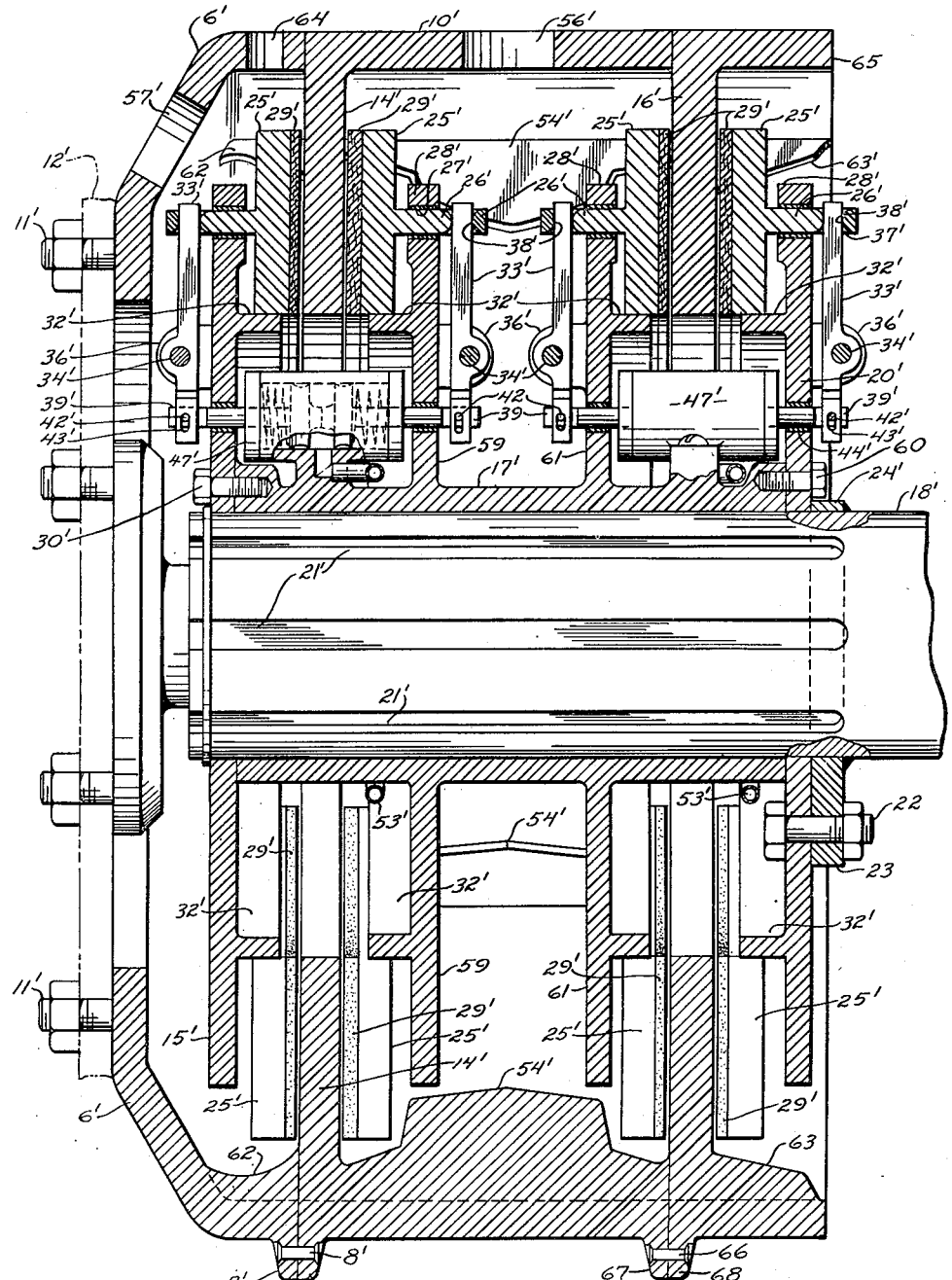

These and other ends are attained by the invention, preferred forms of which are described in the accompanying specification and illustrated in the drawings, in which:

Fig. 1 is an elevational view of the drum, partly broken away, as seen from the inside when mounted on a vehicle, Fig. 2 is a sectional view taken on the staggered line 2—2 of Fig. 1, showing a wheel-mounting disc in phantom line, to which the drum is attached, Fig. 3 is a view similar to Fig. 2, showing a modification, Figs. 4 and 5 are fragmentary views similar to portions of Figs. 2 and 3, showing further modifications, and Fig. 6 is a fragmentary view taken along the line 6—6 of Fig. 5.

Referring to the drawings by characters of reference, there is shown a brake drum 10 of generally conventional, outer form, having an outer, cupped portion 6 with lugs 7 secured by rivets 8 to lugs 9 on portion 10. Portion 6 is secured as by bolts 11 to a wheel disc 12 which is suitably secured to the driven axle 13, or a stub shaft, as the case may be. The brake drum has a pair of integral, inwardly extending, annular flanges 14, 16 arranged radially of the axle 13, which provide friction surfaces cooperating with two sets of brake shoes. The latter are mounted on a spool-shaped casting 17 with radial flanges 15, 20, having a center bore received on the axle housing 18. For assembly purposes, flange 15 is separate from the spool, being secured thereto by bolts 30. The spool 17 is secured against rotation by splines 19 slidable in longitudinal grooves 21 in axle housing 18, and secured against movement axially of housing 18 by means of bolts 22, holding it in engagement with fingers 23 of a flange 24, the latter being fixed to housing 18 as by welding. It will be understood, of course, that other means of securing mounting spool 17 to the axle housing may be resorted to.

The brake shoes 25 are located for co-action with the remote faces of the respective flanges 14, 16. As shown, each set comprises four shoes, but it will be understood that any desired number may be employed and, in particular, the brake shoes may be completely annular members. Each shoe has an integral lug 26 extending from its outer face and slidable in a bore 27 through a boss 28 at the periphery of the flange of mounting spool 17, and is equipped on its inner face with a brake lining 29 secured by any suitable means, such as rivets 31. Integral, ring-shaped flanges 32, extending inwardly from the radial flanges 15, 20 of casting 17, mate with the arcuate, inner edges of shoes 25 and thus provide guides for the shoes in their sliding movement, and restrain them from turning about the axes of pins 26.

Sliding movement of each of the shoes is effected by a lever 33 mounted for rocking motion on a pin 34 carried by a pair of ears 36 on the outer surface of a flange of casting 17. The upper end of lever 33 engages in an opening 37 in pin 26, the opening having curved walls 38 to allow for variation in the angular position of lever 33. The lower end of lever 33 is forked to receive the flat end 39 of a piston rod 41. The flat end 39 of the piston rod carries a transverse pin 42 which is received in elongate slots 43 in the forked end of lever 33. The piston rod 41, which slides in a bushing 44 in the flange of casting 17, is connected to a piston 46 in a hydraulic cylinder 47. It will be noted in Fig. 2 that each cylinder carries two such pistons and serves to actuate two brake shoes, the fluid entering the cylinder through a fitting 48 located intermediate the pistons 46. Each piston rod has a fixed pin 49, and surrounding the piston rod, between pin 49 and the inner face of casting 17, is a compression spring 51. It will be seen that springs 51 normally hold brake shoes 24 retracted against bosses 28 as stops, in which position brake linings 29 are clear of flanges 14, 16, rotating with the brake drum. However, upon introduction of fluid to cylinders 47, levers 33 are moved to urge the brake shoes so that linings 29 engage flanges 14, 16 in a braking action. Upon release of the hydraulic pressure, springs 51 again bring the linings to inoperative position. The fluid is carried from the supply reservoir through a line 52 and is conducted to the several cylinders 47 through a manifold 53.

For cooling purposes, the air between flanges 14, 16 is ejected centrifugally. To this end, the air between the flanges is urged into circular motion by means of webs or vanes 54 extending across the space between the flanges. Midway of each compartment defined by a pair of adjacent webs 54, the outer periphery of drum 10 has an opening 56 providing an escape port for the centrifugally urged air. This creates a lowered pressure within the drum, and cool air is urged by atmospheric pressure through ports 57 provided in drum 10 outside the zone of flanges 14, 16.

The cooling effect is considerably enhanced by means of rods 58 of highly conductive material, such as copper, embedded in and extending between flanges 14 and 16, so as to provide a heat dissipating surface within the rotated body of air. These rods also serve to brace flanges 14, 16 against the pressure of the brake shoes.

In Fig. 3 is shown a modified structure in which each flange 14, 16 is engaged by a pair of brake shoes on its opposite faces. In this form, most of the elements are structurally the same as corresponding elements in Fig. 2 and, therefore, the elements are indicated by the same reference numerals as in Fig. 2, but qualified by prime marks. The only essential differences are that casting 17' has two more radial flanges than casting 17, indicated by the numerals 59, 61, and webs 54' are of considerably less radial extent, and have a special form, to provide clearance for the inner sets of shoes.

For assembly purposes, spool 17' is also further modified in that flange 20' is a separate unit, secured to the cylinder of the spool by bolts 60. Drum 10' is also made in two parts, the separate, inner part 65 being secured by rivets 66, or by bolts, passing through lugs 67, 68 on the respective parts.

If desired, vanes 62, 63 may also be provided on the drum, outwardly of flanges 14', 16', together with suitable exit ports 64, in either form of brake drum shown.

In Fig. 4 is shown a portion of a modified drum which combines the radial, shoe-plate arrangement with circumferential brake shoes. The drum proper is indicated as a whole by the numeral 66, and is of sufficient width to accommodate a conventional brake shoe 67 of sector form and carrying a lining 68. Any known form of band-segment shoes may be employed and, therefore, this element is not shown in detail.

Mounted on a rabbeted portion 69 on the inner rim of drum 66, and secured by bolts 71, is the ring-form flange 72 of a radially arranged ring form plate 73. The latter lies between and is frictionally engageable by shoes 74, 76. The shoe structure, with its mounting and power mechanism, is essentially similar to those described in connection with Figs. 2 and 3, and will be understood by reference to the other figures, without further, detailed description.

In Fig. 5 the radial plate is stationary and friction discs, lying between the respective brake shoes and the plate, are splined to the brake drum for rotation therewith. A drum-shaped casting 77 has an axial opening with splines 78 received in grooves 79 in the dead axle 81. The casting abuts a ring 82, welded to the axle, and is secured in place by a lock ring 83, or the like. Casting 77 has extending circular flanges 84, 86, which support the lever mechanism for operating the brake shoes, this mechanism being substantially as shown in the above-described modifications. A circular flange 87, centrally of casting 77 and integral therewith extends between the brake shoes 88, 89. Between each set of shoes and the central flange 87 is located a series of friction plates 91 having peripheral slots 92 received on splines 93 on the inner wall of the drum 94. It will be seen that all parts within the drum, except the friction plates 91, are stationary and the latter rotate with the drum. Movement of shoes 88, 89 toward central flange 87 grips the friction plates to provide the braking action. A bore 96 in casting 77 provides a cylinder for the shoe-actuating pistons 97, which have rods 98 passing through the casting. Springs 99, surrounding rods 98, retain the shoes retracted in the absence of fluid pressure in the cylinder. The splines 93 act in a manner similar to the vanes 54, 54' of Figs. 2 and 3 in moving air, which is ejected centrifugally through openings 100 in drum 94.

In the modification shown in Fig. 5, it is possible to omit the central flange 87.

While certain preferred forms of the invention have been shown and described, the invention is not to be considered as limited thereto, since changes in the size, shape and arrangement, for instance, of the various parts may be resorted to without departing from the spirit or scope of the invention as defined in the appended claims.

What is claimed is:

1. A brake assembly for wheels comprising a rotating substantially cylindrical drum, a pair of flanges attached to and extending radially inwardly from the drum, support means within said drum and fixed against rotation, a brake shoe carried by said means and arranged for movement into frictional engagement wtih one of said flanges, and a vane extending between said flanges for moving a mass of air within said drum in a circular path, said drum having port means in its periphery radially outward of and in direct communication with the region between said flanges for escape of the air so moved.

2. A brake assembly for wheels comprising a rotating substantially cylindrical drum, a pair of flanges attached to and extending radially inwardly from the drum, support means within said drum and fixed against rotation, a brake shoe carried by said means and arranged for movement into frictional engagement with one of said flanges, and a vane extending between said flanges for moving a mass of air within said drum in a circular path, said drum having port means in its periphery radially outward of and in direct communication with the region between said flanges for escape of the air so moved and said drum having port means apart from the peripheral region of the drum between said flanges for entrance of cool air.

3. A brake assembly for wheels comprising a rotating drum, a pair of flanges extending radially inwardly from the drum, rods of highly heat-conducting material extending between said flanges, support means within said drum and fixed against rotation, a brake shoe carried by said means and arranged for movement into frictional engagement with one of said flanges, and a vane extending between said flanges for moving a mass of air within said drum in a circular path, said drum having port means radially opposite the region between the flanges for escape of the air so moved.

4. A brake drum comprising a circular, band-shaped member having a pair of radially inwardly extending flanges, rods of highly heat-conducting material extending between said flanges, and webs extending between said flanges and constituting vanes for circular movement of the mass of air between said flanges, said drum having openings in its periphery located between said flanges.

5. A brake assembly for wheels comprising a rotating drum, a pair of flanges extending radially inwardly from the drum, rods of highly heat-conducting material extending between said flanges, a plurality of vanes bridging the annular space between said flanges, support means within said drum and fixed against rotation, and brake shoes carried by said support means and arranged to move into frictional engagement with the remote surfaces of said pair of flanges, said drum having air-escape openings in its periphery, in the region between said flanges.

6. A brake assembly for wheels comprising a rotating drum, a pair of flanges extending radially inwardly from the drum, rods of highly heat-conducting material extending between said flanges, a plurality of vanes, bridging the annular space between said flanges, support means within said drum and fixed against rotation, and brake shoes carried by said support means and arranged to move into frictional engagement with the remote surfaces of said pair of flanges, said drum having air-escape openings in its periphery, in the region between said flanges, and said drum having openings apart from the peripheral region between said flanges for entrance of cool air.

7. A brake assembly for wheels comprising a rotating drum, a pair of flanges extending radially inwardly from the drum, rods of highly heat-conducting material extending between said flanges, a plurality of vanes bridging the annular space between said flanges, support means within said drum and fixed against rotation, and a plurality of brake shoes carried by said support means and arranged to move into frictional engagement with faces of each of said pair of flanges, said drum having air-escape openings in its periphery, in the region between said flanges.

References Cited in the file of this patent

UNITED STATES PATENTS

| | | |
|---|---|---|
| 1,527,798 | Hawley | Feb. 24, 1925 |
| 1,834,242 | Hollingsworth | Dec. 1, 1931 |
| 1,977,981 | Bates | Oct. 23, 1934 |
| 2,064,553 | Mack | Dec. 15, 1936 |
| 2,349,928 | Ash | May 30, 1944 |
| 2,550,111 | Else | Apr. 24, 1951 |